(12) United States Patent
Yoneda et al.

(10) Patent No.: US 11,970,395 B2
(45) Date of Patent: Apr. 30, 2024

(54) RARE EARTH PHOSPHATE PARTICLES, METHOD FOR IMPROVING LIGHT SCATTERING USING SAME, AND LIGHT SCATTERING MEMBER AND OPTICAL DEVICE INCLUDING SAME

(71) Applicant: Mitsui Mining & Smelting Co., Ltd., Tokyo (JP)

(72) Inventors: Yoshihiro Yoneda, Ageo (JP); Kazuhiko Kato, Ageo (JP)

(73) Assignee: Mitsui Mining & Smelting Co., Ltd. (JP)

( * ) Notice: Subject to any disclaimer, the term of this patent is extended or adjusted under 35 U.S.C. 154(b) by 491 days.

(21) Appl. No.: 16/768,920

(22) PCT Filed: Dec. 5, 2018

(86) PCT No.: PCT/JP2018/044752
§ 371 (c)(1),
(2) Date: Jun. 2, 2020

(87) PCT Pub. No.: WO2019/124078
PCT Pub. Date: Jun. 27, 2019

(65) Prior Publication Data
US 2021/0188640 A1   Jun. 24, 2021

(30) Foreign Application Priority Data
Dec. 21, 2017 (JP) ................. 2017-245604

(51) Int. Cl.
*C01B 25/45* (2006.01)
*C08K 3/32* (2006.01)
*C08L 101/00* (2006.01)
*G02B 5/02* (2006.01)

(52) U.S. Cl.
CPC ................ *C01B 25/45* (2013.01); *C08K 3/32* (2013.01); *C08L 101/00* (2013.01); *G02B 5/0242* (2013.01); *C01P 2002/70* (2013.01)

(58) Field of Classification Search
CPC .............................................. C08K 2003/328
See application file for complete search history.

(56) References Cited

U.S. PATENT DOCUMENTS

| | | |
|---|---|---|
| 2,995,420 A | 8/1961 | Duncan |
| 3,999,145 A | 12/1976 | Gilman et al. |
| 5,156,764 A | 10/1992 | Kaneda et al. |
| 5,478,381 A | 12/1995 | Ohiwa et al. |
| 5,552,665 A | 9/1996 | Trushell |

(Continued)

FOREIGN PATENT DOCUMENTS

| | | |
|---|---|---|
| CN | 102508325 A | 6/2012 |
| CN | 103226213 A | 7/2013 |

(Continued)

*Primary Examiner* — Peter F Godenschwager
(74) *Attorney, Agent, or Firm* — Harness, Dickey & Pierce, P.L.C.

(57) ABSTRACT

A rare earth phosphate particle containing a rare earth element A, where A is Sc, Y, La, Eu, Gd, Dy, Yb, or Lu, and a rare earth element B different from the element A, where B is Sc, Y, La, Eu, Gd, Dy, Yb, or Lu. The phosphate of the element A is preferably crystalline, with at least part of the element B dissolved in the phosphate of the element A in a solid state. The phosphate of the element A preferably has a xenotime or monazite crystal structure.

20 Claims, 2 Drawing Sheets

(56) References Cited

U.S. PATENT DOCUMENTS

| | | |
|---|---|---|
| 2005/0242702 A1 | 11/2005 | Justel et al. |
| 2006/0001353 A1 | 1/2006 | Zeng et al. |
| 2006/0138387 A1 | 6/2006 | Fan et al. |
| 2006/0166804 A1 | 7/2006 | Sprenger et al. |
| 2007/0069624 A1 | 3/2007 | Dutta et al. |
| 2009/0023574 A1 | 1/2009 | Holand et al. |
| 2016/0015839 A1 | 1/2016 | Orlovskiy et al. |
| 2017/0044041 A1 | 2/2017 | Godard et al. |

FOREIGN PATENT DOCUMENTS

| | | |
|---|---|---|
| EP | 685549 A1 | 12/1995 |
| JP | S50-99980 A | 8/1975 |
| JP | H02-276884 A | 11/1990 |
| JP | H07-188599 A | 7/1995 |
| JP | H09-510048 A | 10/1997 |
| JP | 2005-527953 A | 9/2005 |
| JP | 2005-330307 A | 12/2005 |
| JP | 2006-500312 A | 1/2006 |
| JP | 2008-541968 A | 11/2008 |
| JP | 2010-138270 A | 6/2010 |
| JP | 2014-201495 A | 10/2014 |
| JP | 2017-500263 A | 1/2017 |
| WO | 2014-036501 A2 | 3/2014 |

RARE EARTH PHOSPHATE PARTICLES, METHOD FOR IMPROVING LIGHT SCATTERING USING SAME, AND LIGHT SCATTERING MEMBER AND OPTICAL DEVICE INCLUDING SAME

CROSS REFERENCE TO RELATED APPLICATIONS

This application is a U.S. National Stage Application of International Application No. PCT/JP2018/044752, filed on Dec. 5, 2018, and claims priority to Japanese Patent Application No. 2017-245604, filed on Dec. 21, 2017. The entire disclosures of the above applications are expressly incorporated herein by reference.

BACKGROUND

Technical Field

This invention relates to rare earth phosphate particles. It also relates to a method for improving light scattering properties using the rare earth phosphate particles and a light diffusing element and an optical device containing the rare earth phosphate particles.

Related Art

A light-diffusing sheet made of a transparent resin matrix containing light-scattering particles is used in various optical devices, such as LCD backlight modules in TV sets and smartphones, screens of image displays (e.g., rear-projection screens), transparent screens for head-up displays and projectors, sealants in LED devices and μLED devices, and covers in lighting fittings. A light-diffusing sheet in these applications is required to have excellent light scattering properties while securing transparency. A wide viewing angle is also required of a light-diffusing sheet. In view of these requirements, examples of useful light-scattering particles include titania, silica, zirconia, barium titanate, zinc oxide, and resin particles. For example, JP 2010-138270A proposes use of zinc oxide as light-scattering particles.

A light-diffusing sheet containing the light-scattering particles proposed in JP 2010-138270A has transparency and light-scattering properties. When actually applied to a display, however, the light-diffusing sheet cannot be said to have sufficient light-scattering properties to provide a clear image, leaving room for improvement. There is also room for improvement in terms of viewing angle.

An object of the invention is to provide particles that are capable of not only improving light-scattering properties while securing transparency of the substrate but also securing a wide viewing angle when placed inside or on the surface of a substrate.

SUMMARY

The invention has accomplished the above object by providing rare earth phosphate particles containing a rare earth element A and a rare earth element B different from the element A. The element A is Sc, Y, La, Eu, Gd, Dy, Yb, or Lu. The rare earth element B is Sc, Y, La, Eu, Gd, Dy, Yb, or Lu.

The invention also provides a method for improving light-scattering properties of a substrate. The method includes incorporating the rare earth phosphate particles into the substrate or placing the rare earth phosphate particles on the surface of the substrate.

The invention also provides a light-diffusing element made of a resin composition containing the rare earth phosphate particles and a resin and an optical device having the light-diffusing element.

BRIEF DESCRIPTION OF THE DRAWINGS

FIG. 1A is a schematic side view, and FIG. 1B is a schematic top view.

DETAILED DESCRIPTION

Figure 1A:
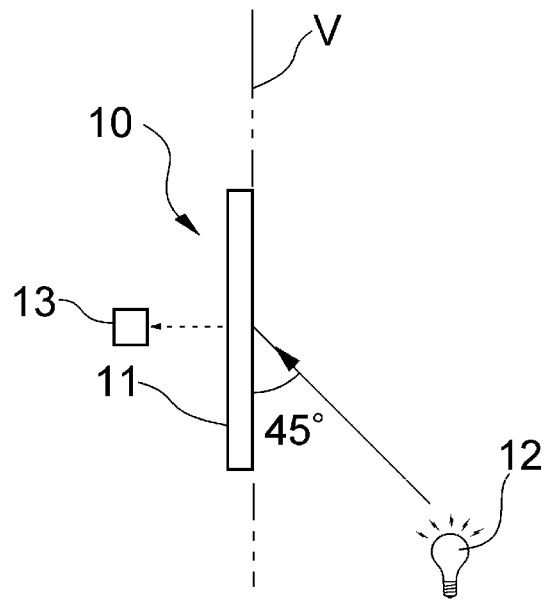
FIG. 1A and FIG. 1B each illustrate the method for measuring luminance of a light-diffusing sheet.

The invention will be described on the basis of its preferred embodiments. The rare earth phosphate particles of the invention are to be disposed inside or on the surface of a transparent substrate and used to cause light scatter. Specifically, the rare earth phosphate particles of the invention are placed inside a substrate in a uniformly dispersed state, is placed inside a substrate in a concentrated state in one side of the substrate and the vicinity thereof, or dispersed uniformly in a coating layer provided on the surface of a substrate so as to cause incident light on the substrate to scatter. Incident light can generally be scattered forward (forward scatter) and backward (back scatter). With respect to the direction of scatter, the rare earth phosphate particles of the invention are used to cause either one or both of forward scatter and back scatter. In what follows, the term "scatter" or "scattering" is intended to include both forward scatter and back scatter, and the term "light" refers to light containing rays of the visible wavelength region.

The rare earth phosphate particles of the invention have the form of an aggregate of particles of a rare earth phosphate containing a rare earth element A and a rare earth element B different from the element A. The rare earth elements A and B are different from each other and independently represent Sc, Y, La, Eu, Gd, Dy, Yb, and Lu. As used herein, the term "particles" refers to either powder as an aggregate of particles or individual particles constituting the powder, which depends on the context. The rare earth phosphate particles may be used in the form of powder as is, or may be made into a slurry in a liquid medium before use.

The rare earth phosphate particle of the invention may contain, in addition to the rare earth elements A and B, one or more rare earth elements that are different from the elements A and B and selected from Sc, Y, La, Eu, Gd, Dy, Yb, and Lu. The rare earth phosphate particle of the invention may further contain an element other than the above described rare earth elements (i.e., Sc, Y, La, Eu, Gd, Dy, Yb, and Lu) unless the effects of the invention are impaired.

Rare earth phosphates are high refractive index materials. Because of this, the rare phosphate particles of the invention distributed inside or on the surface of a substrate causes a large amount of light scattering.

Rare earth phosphates generally have high Abbe numbers. As a result of the inventors' researches, it has been revealed that the rare earth phosphates have smaller dependence of refractive index on wavelength than other materials with high Abbe number, such as zirconia. In other words, they show smaller variability in degree of refraction when incident light containing rays of various wavelengths enters them. Therefore, use of the rare earth phosphate particles of the invention enables light scatter with good color reproducibility.

In addition, using the rare earth phosphate particles of the invention, which contain two different rare earth elements A and B, brings about the advantage that a light-diffusing element containing them has a wider viewing angle as compared with the use of rare earth phosphate particles containing only one rare earth element. Thus, the rare earth phosphate particles of the invention are an extremely excellent material that achieves a wide viewing angle as well as high light transmitting and scattering properties.

The rare earth phosphate used in the invention may be either crystalline or amorphous (non-crystalline). In general, the rare earth phosphate particles which are produced by the method hereinafter described are crystalline. The rare earth phosphate which are crystalline are preferred because high refractive indices are provided.

When the rare earth phosphate used in the invention is crystalline, it is preferable in view of a wide viewing angle that the rare earth phosphate be a crystalline phosphate of the rare earth element A with at least part of the rare earth element B dissolved therein in a solid state. Whether at least part of the element B is dissolved in a crystalline phosphate of the rare earth element A in a solid state can be determined through XRD analysis of the phosphate. More specifically, when an XRD pattern of a phosphate containing both rare earth elements A and B shows only the diffraction peaks assigned to the element A phosphate, it is determined that at least part of the element B is dissolved in the element A phosphate in a solid state. Also, when an XRD pattern of a phosphate containing both rare earth elements A and B shows a shift of a peak position ($2\theta$) to a lower or higher angle from a reference peak position (e.g., the position of the maximum intensity peak) of a phosphate containing only the element A, it is determined that at least part of the element B is dissolved in the element A phosphate in a solid state. Which of the two rare earth elements is the element A or B can be determined from the results of XRD of the rare earth phosphate under analysis. Specifically, when the diffraction peak with the maximum intensity is assigned to the phosphate of the element A, it is determined that the element B is dissolved in the element A phosphate in a solid state. Conversely, when the diffraction peak with the maximum intensity is assigned to the phosphate of the element B, it is determined that the element A is dissolved in the element B phosphate in a solid state.

When the rare earth phosphate used in the invention is a solid solution in which part of the rare earth element B is dissolved in the element A phosphate, the rest of the element B, which is not dissolved, may exist in the crystalline or amorphous (non-crystalline) state in the inside or the surface portion of the rare earth phosphate particle.

When the rare earth phosphate used in the invention is the above described solid solution, the phosphate of the rare earth element A preferably has a xenotime or monazite crystal structure in view of providing a wide viewing angle. Such a rare earth phosphate is produced advantageously by, for example, the method described later.

When the rare earth phosphate used in the invention has the above described crystal structure, the crystal structure is preferably such that the XRD pattern shows a shift of the position ($2\theta$) of the maximum intensity peak toward smaller or larger angles from the reference position of the maximum intensity peak of a phosphate containing only the rare earth element A, which is not a solid solution, by 0.01 to 0.70°. With the amount of peak shift in that range, a wide viewing angle is achieved easily. The amount of peak shift is more preferably 0.03 to 0.70°, even more preferably 0.05 to 0.70°, in terms of a wide viewing angle.

Irrespective of whether the rare earth phosphate for use in the invention is crystalline or amorphous, the content of the rare earth element B is preferably 0.1 to 50 mol %, more preferably 5 to 50 mol %, even more preferably 10 to 50 mol %, based on the total number of moles of the rare earth elements A and B in view of easily achieving a wide viewing angle. When, in particular, the rare earth phosphate used in the invention is a solid solution in which at least part of the element B is dissolved in the phosphate of the rare earth element A, the above range of the content of the element B is more effective in achieving a wide viewing angle.

The element A in the rare earth phosphate for use in the invention is preferably Y, Gd, or La. A combination of Gd as element A and Y as element B in the rare earth phosphate is especially preferred in terms of ease of achieving a wide viewing angle as well as small dependence of refractive index on wavelength.

It is advantageous for the rare earth phosphate particles of the invention to have a $D_{50}$ of 0.1 to 20 μm, the $D_{50}$ being a particle diameter at 50% in the volume-based cumulative particle size distribution as measured by laser diffraction particle size distribution analysis. As a result of the inventor's study, the rare earth phosphate particles with a $D_{50}$ in that range have been proved capable of increasing the degree of light scatter while retaining the transparency of the substrate when placed inside or on the surface of a substrate to cause light scatter. With a view to further increasing the degree of light scatter while retaining the transparency of the substrate, the $D_{50}$ of the rare earth phosphate particles is more preferably 0.1 to 20 μm, even more preferably 0.1 to 10 μm, still more preferably 0.1 to 3 μm. The rare earth phosphate particles with such a particle size can suitably be produced by, for example, the method hereinafter described.

The $D_{50}$ may be determined as follows. The rare earth phosphate particles are mixed with water and dispersing treatment is performed on the resulting mixture for 1 minute in a common ultrasonic bath. The determination of the particle size is performed using Beckman Coulter Counter LS13 320.

The shape of the rare earth phosphate particles is not critical as long as the $D_{50}$ is in the above range. As the shape of the individual particles approaches a sphere, isotropic light scattering tends to become dominant, and the dispersibility in the resin composition for forming a substrate or the resin composition for forming a surface coating layer of a substrate tends to become better. On the other hand, when individual rare earth phosphate particles have an anisotropic shape, such as rod-shape, rare earth phosphate particles tend to provide a light-diffusing sheet having excellent transparency as well as light-scattering properties.

With respect to the particle size distribution of the rare earth phosphate particles, it has been found by the inventors that the rare earth phosphate particles having a sharper particle size distribution exhibits higher light-scattering properties. The particle size distribution of the rare earth phosphate particles can be evaluated using the value $D_{99}/D_{50}$ as a measure. $D_{99}$ represents the particle diameter at 99% in the volume-based cumulative particle size distribution as measured by laser diffraction particle size distribution analysis. As $D_{99}/D_{50}$ approaches 1, the particle size distribution becomes sharper. The value $D_{99}/D_{50}$ in the invention is preferably 10 or smaller, more preferably 5 or smaller, even more preferably 2.5 or smaller. $D_{99}$ can be determined in the same manner as for $D_{50}$.

The rare earth phosphate particles of the invention preferably have a BET specific surface area of 1 to 100 m$^2$/g, more preferably 3 to 50 m$^2$/g, even more preferably 5 to 30 m$^2$/g, in terms of particle size control. The BET specific surface area can be determined by nitrogen adsorption using, for example, FlowSorb 2300 from Shimadzu Corp. For example, the amount of the sample powder is 0.3 g, and previous degassing is carried out in the atmosphere at 120° C. for 10 minutes.

The rare earth phosphate particles of the invention may be treated to have the surface thereof rendered lipophilic to a degree that does not impair the effects of the invention, in order to improve the dispersibility in the resin composition for forming a resin substrate or the resin composition for forming a surface coating layer of a substrate. Such a surface treatment for lipophilicity is exemplified by a treatment with any of various coupling agents and a treatment with an organic acid, such as a carboxylic acid or a sulfonic acid. Examples of useful coupling agents include organometallic compounds, such as silane, zirconium, titanium, and aluminum coupling agents.

The coupling agents may be used either individually or in combination of two or more thereof. In using a silane coupling agent, the surface of the rare earth phosphate particles is coated with a silane compound. The silane compound preferably has a lipophilic group, e.g., a substituted or unsubstituted alkyl group. The alkyl group may be linear or branched. Whether linear or branched, the alkyl group preferably has 1 to 20 carbon atoms for providing good affinity to resins. Examples of the substituent of the substituted alkyl group include amino, vinyl, epoxy, styryl, methacryl, acryl, ureido, mercapto, sulfide, and isocyanate groups. The amount of the silane compound coating the rare earth phosphate particles is preferably 0.01 to 200 mass %, more preferably 0.1 to 100 mass % relative to the mass of the rare earth phosphate particles in terms of good affinity to resins.

The carboxylic acid to be used in the surface treatment preferably has a substituted or unsubstituted alkyl group. The alkyl group may be linear or branched. Whether linear or branched, the alkyl group preferably has 1 to 20 carbon atoms for providing good affinity to resins. Examples of the carboxylic acid include butanoic acid, pentanoic acid, hexanoic acid, heptanoic acid, octanoic acid, nonanoic acid, decanoic acid, dodecanoic acid, tetradecanoic acid, pentadecanoic acid, hexadecanoic acid, heptadecanoic acid, cis-9-octadecenoic acid, and cis,cis-9,12-octadecadienoic acid.

The rare earth phosphate particles of the invention can be added to a resin, or dissolved in an organic solvent to make a dispersion which is mixed with a resin, to provide a resin composition having improved light scattering properties.

The resin composition is not particularly limited in form and may have the form of sheet (film), membrane, powder, pellets (master batch), application liquid (coating), and so forth. A sheet form is advantageous for ease of application to a light-diffusing sheet.

The resin to which the rare earth phosphate particles of the invention are added is not particularly limited. Any moldable thermoplastic resins, thermosetting resins, and ionizing radiation-curable resins may be used. Thermoplastic resins are preferred for ease of molding into sheet form.

Examples of useful thermoplastic resins include polyolefin resins, such as polyethylene and polypropylene; polyester resins, such as polyethylene terephthalate and polybutylene terephthalate; polycarbonate resins; polyacrylic resins, such as polyacrylic acid and esters thereof and polymethacrylic acid and esters thereof; polyvinyl resins, such as polystyrene and polyvinyl chloride; cellulose resins, such as triacetyl cellulose; and urethane resins, such as polyurethane.

Examples of useful thermosetting resins include silicone resins, phenol resins, urea resins, melamine resins, furan resins, unsaturated polyester resins, epoxy resins, diallyl phthalate resins, guanamine resins, ketone resins, aminoalkyd resins, urethane resins, acrylic resins, and polycarbonate resins.

Examples of useful ionizing radiation-curable resins include photopolymerizable prepolymers that are curable through crosslinking upon irradiation with ionizing radiation such as ultraviolet radiation and electron beams. The photopolymerizable prepolymer is preferably an acrylic prepolymer having at least two acryloyl groups per molecule and forming a three-dimensional network structure upon curing by crosslinking. Examples of such an acrylic prepolymer include urethane acrylates, polyester acrylates, epoxy acrylates, melamine acrylates, polyfluoroalkyl acrylates, and silicone acrylates. The acrylic prepolymer may be used alone but is preferably combined with a photopolymerizable monomer so as to improve crosslinking curability thereby to form a light-diffusing layer with improved hardness.

Examples of the photopolymerizable monomer include monofunctional acrylic monomers, such as 2-ethylhexyl acrylate, 2-hydroxyethyl acrylate, 2-hydroxypropyl acrylate, and butoxyethyl acrylate; bifunctional acrylic monomers, such as 1,6-hexanediol diacrylate, neopentyl glycol diacrylate, diethylene glycol diacrylate, polyethylene glycol diacrylate, and hydroxypivalic ester neopentyl glycol diacrylate; and polyfunctional acrylic monomers, such as dipentaerythritol hexaacrylate, trimethylpropane triacrylate, and pentaerythritol triacrylate. They may be used either individually or in combination of two or more thereof.

When the photopolymerizable prepolymer is cured by irradiation with ultraviolet radiation, the prepolymer is preferably combined with an additive, such as a photopolymerization initiator or a photopolymerization accelerator, as well as with the photopolymerizable monomer.

Examples of useful photopolymerizable initiator include acetophenones, benzophenones, Michler's ketone, benzoins, benzyl methyl ketals, benzoyl benzoates, α-acyloxime esters, and thioxanthones.

The photopolymerization accelerator is used to reduce the polymerization inhibition by air during the curing reaction thereby to accelerate the curing rate. Examples of the photopolymerization accelerator include isoamyl p-dimethylaminobenzoate and ethyl p-dimethylaminobenzoate.

In the light-diffusing element made of a resin composition containing the rare earth phosphate particles of the invention and a resin, the proportion of the rare earth phosphate particles is preferably such that the thickness T (μm) of a light-diffusing layer and the concentration C (mass %) of the rare earth phosphate particles in the light-diffusing layer satisfies relation (I) below in view of the balance between light transmitting properties and light scattering properties.

$$5 \leq (T \times C) \leq 500 \tag{I}$$

When the light-diffusing element is a light-diffusing sheet made of the resin composition, the "thickness" of a light-diffusing layer refers to the thickness of the sheet, or when the light-diffusing element is composed of a substrate and a surface coating layer made of the resin composition, the "thickness" of a light-diffusing layer refers to the thickness of the surface coating layer. It is more preferred for T and C to satisfy relation (II):

$$50 \leq (T \times C) \leq 100 \tag{II}$$

In the light-diffusing element made of a resin composition containing the rare earth phosphate particles of the invention and a resin, the thickness of the light-diffusing layer is preferably 2 to 10,000 µm in view of light-scattering properties and handling properties.

The light-diffusing element of such a type as a light-diffusing sheet made of a resin composition containing the rare earth phosphate particles of the invention and a transparent resin may be produced by, for example, mixing the rare earth phosphate particles of the invention into a molten resin, and molding the resulting mixture into sheet form by any known techniques, such as blown film extrusion, T-die extrusion, solution casting, and calendering. The light-diffusing element of such a type as a light-diffusing sheet having the rare earth phosphate particles of the invention placed on the surface of a transparent sheet substrate may be obtained by, for example, mixing the rare earth phosphate particles of the invention with an organic solvent and a binder resin to prepare a coating liquid, and applying the coating liquid to a substrate using a bar, a blade, a roller, a spray gun, or the like. The rare earth phosphate particles of the invention may directly be applied to the resin sheet substrate by spattering deposition or a like technique. As used herein, the term "transparent resin" refers to a resin having permeability to visible light. The light-diffusing sheet thus obtained is suited for use as display members, lighting members, window members, illumination members, light guide panel members, projector screens, transparent screens for head-up displays, sealants for LED devices and µLED devices, agricultural materials, such as a greenhouse material, and the like. The light-diffusing sheet is also useful as incorporated in optical devices, such as liquid crystal TV sets, personal computers, mobile devices (e.g., tablet computers, and smartphones), and lighting fittings.

A preferred method for producing the rare earth phosphate particles of the invention will then be described. The rare earth phosphate particles of the invention are produced by mixing an aqueous solution containing sources of at least two different rare earth elements and an aqueous solution containing a phosphate group to precipitate a phosphate of the two or more rare earth elements. For example, an aqueous solution containing a phosphate group is added to an aqueous solution containing sources of two or more rare earth elements to form a rare earth phosphate precipitate. The precipitate is collected by a liquid-solid separation means, dried, and fired to give rare earth phosphate particles. In an example of the preferred method, the collected precipitate is dried by, for example, spray drying and then fired to yield particles of desired shape.

The step of forming a rare earth phosphate precipitate is preferably carried out while heating. On this occasion, the aqueous solution containing rare earth element sources is preferably heated to 50° to 100° C., more preferably 70° to 95° C. By allowing the reaction to occur while heating the system at a temperature in that range, particles with a desired $D_{50}$ and a desired specific surface area are obtained.

The aqueous solution containing at least two different rare earth element sources preferably has a total concentration of rare earth elements of 0.01 to 2.0 mol/L, more preferably 0.01 to 1.5 mol/L, even more preferably 0.01 to 1.0 mol/L. It is preferred that each of the rare earth elements be present in the aqueous solution in the form of a trivalent ion or a complex ion of the trivalent ion and one or more ligands. The aqueous solution containing sources of two or more different rare earth elements is prepared by dissolving rare earth oxides (e.g., $Ln_2O_3$) in, e.g., a nitric acid aqueous solution.

The aqueous solution containing a phosphate group preferably has a total concentration of the phosphoric acid chemical species of 0.01 to 5 mol/L, more preferably 0.01 to 3 mol/L, even more preferably 0.01 to 1 mol/L. An alkali species may be added for pH adjustment. As an alkali species, basic compounds, such as ammonia, ammonium hydrogen carbonate, ammonium carbonate, sodium hydrogen carbonate, sodium carbonate, ethylamine, propylamine, sodium hydroxide, and potassium hydroxide, may be used.

In view of forming the precipitated product efficiently, the mixing ratio of the aqueous solution containing sources of two or more different rare earth elements and the phosphate group-containing aqueous solution is preferably such that the molar ratio of phosphate ion to total rare earth ion is 0.5 to 10, more preferably 1 to 10, even more preferably 1 to 5.

The thus formed rare earth phosphate particles are separated from the liquid medium in a usual manner, followed by washing with water at least once. Washing is preferably repeated until the conductivity of the washing filtrate decreases to, for example, 2000 µS/cm or lower.

The step of firing the rare earth phosphate precipitate may be carried out in an oxygen-containing atmosphere, such as air. In this case, the firing temperature is preferably 80° to 1500° C., more preferably 400° to 1300° C. Rare earth phosphate particles having a desired crystal structure and a desired specific surface area can be obtained easily by adopting the above temperature range. If the firing temperature is excessively high, it tends to result that sintering proceeds to increase the crystallinity of the particles and that the specific surface area decreases. The firing time is preferably 1 to 20 hours, more preferably 1 to 10 hours, provided that the firing temperature is in the above range.

EXAMPLES

The invention will now be illustrated by way of Examples, but it should be understood that the invention is not limited thereto. Unless otherwise noted, all the percentages are by mass.

Example 1

Water weighing 600 g was put in a glass container (glass container 1), and 61.7 g of 60% nitric acid (purchased from Wako Pure Chemical Ind., Ltd.), 16.6 g of $Y_2O_3$ (from Nippon Yttrium Co., Ltd.), and 3.0 g of $Gd_2O_3$ were added thereto, followed by heating to 80° C. to prepare an aqueous solution. The molar ratio of Y to Gd was 4:1. Separately, water weighing 600 g was put in another glass container (glass container 2) and 18.8 g of 85% phosphoric acid was added thereto.

The contents of the glass container 2 was poured into the glass container 1, followed by aging for 1 hour. The precipitate thus formed was washed by decantation until the conductivity of the supernatant liquid decreased to 100 µS/cm or lower. After the washing, the solid was collected by filtration under reduced pressure, dried in the atmosphere at 120° C. for 5 hours, and fired in the atmosphere at 900° C. for 3 hours to give rare earth phosphate particles.

Examples 2 and 3

Rare earth phosphate particles were prepared in the same manner as in Example 1, except for changing the molar ratio of Y to Gd as shown in Table 1 below.

Examples 4 to 9

Rare earth phosphate particles were prepared in the same manner as in Example 1, except for using the rare earth elements A and B shown in Table 1 at the molar ratio shown.

Reference Example 1

Rare earth phosphate particles were prepared in the same manner as in Example 1, except for using no $Gd_2O_3$, using 26.6 g of $Y_2O_3$, and conducting the firing at 450° C. for 3 hours.

Figure 2:
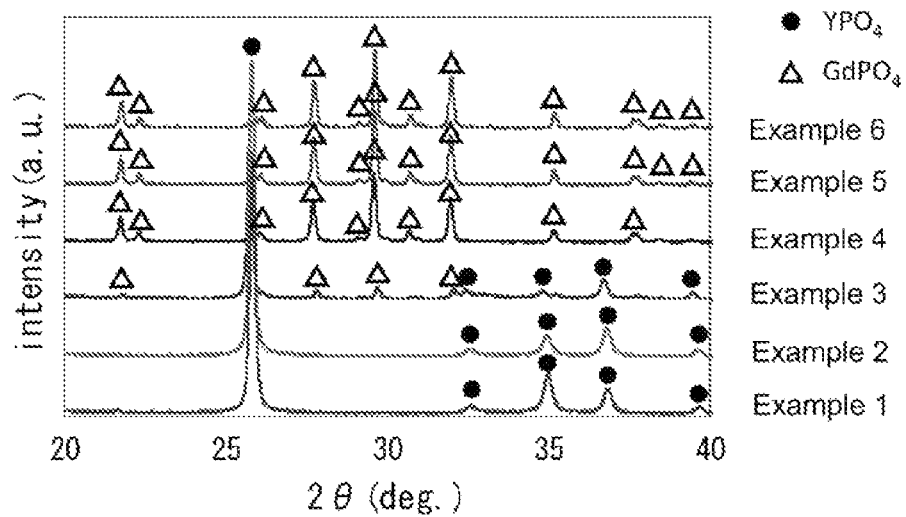
FIG. 2 shows powder XRD patterns of the rare earth phosphate particles obtained in Examples 1 through 6.

Evaluation:

The rare earth phosphate particles obtained in Examples and Reference Example were analyzed in terms of crystal structure, BET specific surface area, $D_{50}$, $D_{99}$, and amount of shift of the position of the maximum intensity peak from the reference peak position of the phosphate of the element A. A light-diffusing sheet was made using the rare earth phosphate particles and total transmittance, haze, and luminance of the resulting light-diffusing sheet were determined by the methods described below. The results are shown in Table 1. The rare earth phosphate particles of Examples 1 to 6 were analyzed by powder XRD analysis using the equipment described below. The results of XRD are shown in FIG. 2.

Crystal Structure and Amount of Shift of Position of Maximum Intensity Peak from Reference Position of Rare Earth Element A Phosphate:

The rare earth phosphate particles obtained in Examples and Reference Example were mounted in a sample holder. RINT-TTR III from Rigaku Corp. was used to measure angles and intensities of diffraction lines under the following conditions to obtain a diffraction pattern.

Ray source: CuKα radiation
Tube voltage: 50 kV
Tube current: 300 mA
Step size: 0.02°
Scan speed: 4.0°/min
Start angle: 20°
End angle: 80°

The reference peak positions (2θ) of $YPO_4$, $GdPO_4$, and $LaPO_4$ from which the amount of shift is measured are obtained from ICSD (International Crystal Structure Database).

Determination of Total Transmittance and Haze:

A polycarbonate resin was used as a resin matrix. The resin and the rare earth phosphate particles were premixed and extrusion molded into a light-diffusing sheet measuring 100 mm×100 mm×1 mm (t). The ratio of the rare earth phosphate particles to the resin was adjusted so that all the resulting light-diffusing sheets might have almost the same haze values. The thus adjusted ratios are shown in Table 1. The total transmittance and haze of the light-diffusing sheet were measured using a haze meter NDH 2000 from Nippon Denshoku Industries Co., Ltd.

Figure 1B:
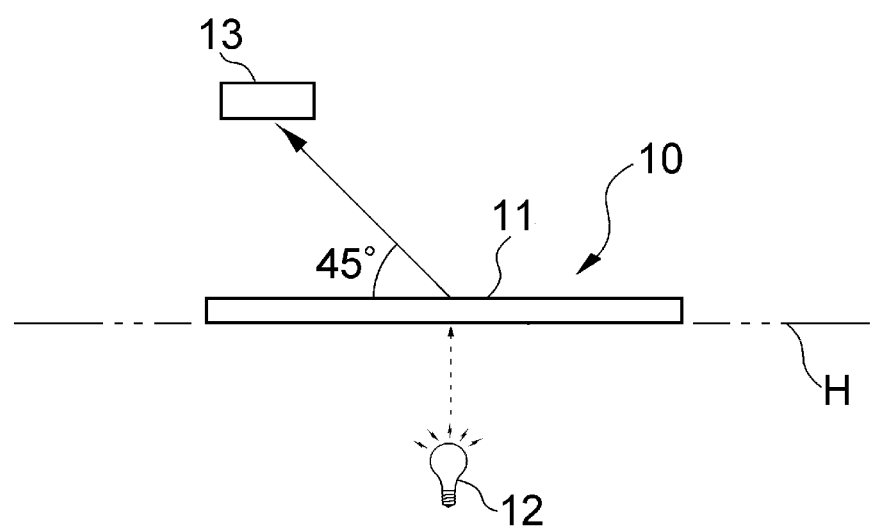

Evaluation of Viewing Angle:

As illustrated in FIG. 1A, the light-diffusing sheet 10 after the measurement of total transmittance was placed along a vertical plane V and irradiated with light using a short focus projector as a light source 12. Light was directed upward to the light-diffusing sheet 10 with an angle of 45° to the vertical plane V. A luminance meter 13 was set on the other side than the light-irradiated side (i.e., the side of the light emitting surface 11 of the light-diffusing sheet 10) to measure the luminance of the light emitted from the light-diffusing sheet 10. As illustrated in FIG. 1B, the luminance meter 13 was placed at an angle of 45° to a line H transversely passing through the light-diffusing sheet 10 in parallel with the horizon. The luminance value of the light-diffusing sheet using the rare earth phosphate particles of each Example was divided by that of the light-diffusing sheet using the rare earth phosphate particles of Reference Example 1 to give a luminance ratio, (luminance of the light-diffusing sheet using the rare earth phosphate particles of each Example)/(luminance of the light-diffusing sheet using the rare earth phosphate particles of Reference Example 1). In Table 1, "SSA" stands for specific surface area.

TABLE 1A

| | | | | | Rare Earth Phosphate Particles | | | | Reference for Peak Shift Measurement | | Light-Diffusing Sheet (1 mm thickness) | | | |
|---|---|---|---|---|---|---|---|---|---|---|---|---|---|---|
| | Element of Phosphate | | | Crystal Structure of | | | | | | Reference | | Total | | |
| | A | B | A:B (mol) | Phosphate of Element A | BET SSA (m²/g) | $D_{50}$ (μm) | $D_{99}$ (μm) | Peak Shift (°) | Amount of Reference Compound* | Peak Position (°) | Ratio of Particles (mass %) | Trans-mittance (%) | Haze (%) | Luminance Ratio** |
| Ex. 1 | Y | Gd | 4:1 | xenotime | 11.5 | 0.2 | 1.9 | 0.07 (to lower angle) | $YPO_4$ | 25.9 | 0.05 | 88.8 | 10.7 | 2.4 |
| Ex. 2 | Y | Gd | 3:1 | xenotime | 11.8 | 0.2 | 2.0 | 0.09 (to lower angle) | $YPO_4$ | 25.9 | 0.05 | 88.4 | 10.1 | 3.3 |
| Ex. 3 | Y | Gd | 1:1 | xenotime | 12.3 | 0.2 | 1.7 | 0.16 (to lower angle) | $YPO_4$ | 25.9 | 0.07 | 88.7 | 10.2 | 6.3 |
| Ex. 4 | Gd | Y | 9:1 | monazite | 8.3 | 0.2 | 2.1 | 0.01 (to lower angle) | $GdPO_4$ | 29.6 | 0.15 | 84.1 | 10.3 | 11.6 |
| Ex. 5 | Gd | Y | 4:1 | monazite | 7.6 | 0.2 | 2.2 | 0.02 (to lower angle) | $GdPO_4$ | 29.6 | 0.11 | 85.3 | 10.0 | 9.5 |

TABLE 1A-continued

Rare Earth Phosphate Particles

| | Element of Phosphate | | A:B (mol) | Crystal Structure of Phosphate of Element A | BET SSA (m²/g) | D₅₀ (μm) | D₉₉ (μm) | Peak Shift (°) | Reference for Peak Shift Measurement | | Light-Diffusing Sheet (1 mm thickness) | | | |
|---|---|---|---|---|---|---|---|---|---|---|---|---|---|---|
| | A | B | | | | | | | Reference Compound* | Reference Peak Position (°) | Ratio of Particles (mass %) | Total Transmittance (%) | Haze (%) | Luminance Ratio** |
| Ex. 6 | Gd | Y | 3:1 | monazite | 7.1 | 0.3 | 2.1 | 0.04 (to higher angle) | $GdPO_4$ | 29.6 | 0.11 | 85.1 | 10.1 | 9.4 |
| Ex. 7 | La | Y | 1:1 | monazite | 8.4 | 0.4 | 1.3 | 0.66 (to higher angle) | $LaPO_4$ | 28.6 | 0.05 | 88.5 | 9.7 | 6.0 |
| Ex. 8 | Y | Lu | 1:1 | xenotime | 27.9 | 0.3 | 1.7 | 0.20 (to higher angle) | $YPO_4$ | 25.9 | 0.20 | 84.2 | 10.4 | 3.2 |
| Ex. 9 | Y | Yb | 1:1 | xenotime | 16.7 | 0.5 | 1.2 | 0.17 (to higher angle) | $YPO_4$ | 25.9 | 0.13 | 86.8 | 9.9 | 7.8 |
| Ref. Ex. 1 | Y | — | — | xenotime | 10.0 | 1.5 | 6.8 | — | — | — | 0.05 | 89.3 | 10.9 | — |

*Phosphate of element A.
**Relative to the luminance of Reference Example 1.

As is apparent from the results in Table 1, when the rare earth phosphate particles of Examples are used, total light transmittance and haze values comparative to those obtained in using the rare earth phosphate particles of Reference Example 1 are obtained. These characteristic values adequately meet the performance requirements of transparent screens and other applications. It has thus been proved that the light-diffusing sheets containing the rare earth phosphate particles of Examples and Reference Example 1 have high transmittance and light scattering properties. As compared with the rare earth phosphate particles of Reference Example 1, the rare earth phosphate particles of Examples provide high luminance even when the location of measuring the luminance is away at a large angle from the front direction of the light source. It is seen from this that the light-diffusing sheets using the rare earth phosphate particles of Examples have a wider viewing angle than that using the rare earth phosphate particles of Reference Example 1 when used as a transparent screen and the like.

INDUSTRIAL APPLICABILITY

The rare earth phosphate particles of the invention improve light-scattering properties while retaining the transparency of the substrate and securing a wide viewing angle, when placed inside or on the surface of a substrate.

The invention claimed is:

1. Rare earth phosphate particles comprising:
a rare earth element A; and
a rare earth element B different from the element A,
wherein the element A is Sc, Y, La, Gd, or Lu,
the element B is Sc, Y, La, Gd, or Lu,
the phosphate of the element A is crystalline, and
at least part of the element B is dissolved in the phosphate of the element A in a solid state.

2. The rare earth phosphate particles according to claim 1, wherein the phosphate of the element A has a xenotime or monazite structure.

3. The rare earth phosphate particles according to claim 2, having an XRD pattern wherein the position (2θ) of a peak with the maximum intensity shifts to a lower or higher angle by 0.01° to 0.70° from a reference position of a peak with the maximum intensity of a phosphate of only the element A.

4. The rare earth phosphate particles according to claim 3, wherein
the element A is Y, Gd, or Lu, and
the element B is Y, Gd, or Lu.

5. The rare earth phosphate particles according to claim 2, wherein
the element B is Y, Gd, or Lu.

6. The rare earth phosphate particles according to claim 2, wherein
the element A is Y, Gd, or Lu, and
the element B is Y, Gd, or Lu.

7. The rare earth phosphate particles according to claim 1, wherein the element B is present in an amount of 0.1 to 50 mol % based on the total number of moles of the elements A and B.

8. The rare earth phosphate particles according to claim 1, wherein the element A is Y, Gd, or La.

9. The rare earth phosphate particles according to claim 8, wherein
the element B is Y, Gd, or Lu.

10. The rare earth phosphate particles according to claim 1, being placed inside or on a surface of a substrate to cause light scattering.

11. The rare earth phosphate particles according to claim 1, wherein
the element B is Y, Gd, or Lu.

12. The rare earth phosphate particles according to claim 1, wherein
the element A is Y, Gd, or Lu, and
the element B is Y, Gd, or Lu.

13. A method for improving light-scattering properties of a substrate, comprising:
incorporating the rare earth phosphate particles according to claim 1 into the substrate.

14. A method for improving light-scattering properties of a substrate, comprising:
placing the rare earth phosphate particles according to claim 1 on the surface of the substrate.

15. A dispersion comprising:
the rare earth phosphate particles according to claim 1 and an organic solvent.

16. A resin composition comprising:
the rare earth phosphate particles according to claim 1 and a resin.

17. A light-diffusing element comprising:
the resin composition according to claim 16.

18. An optical device comprising the light-diffusing element according to claim 17.

19. A light-diffusing element, having a light-diffusing layer, the light-diffusing layer comprising:
the resin composition according to claim 16 and having a thickness T (μm) and a rare earth phosphate particle concentration C (mass %), the T and C satisfying relation (I):

$$5 \leq (T \times C) \leq 500 \tag{I}$$

20. An optical device comprising the light-diffusing element according to claim 19.

\* \* \* \* \*